US012170628B2

(12) United States Patent
Hu et al.

(10) Patent No.: US 12,170,628 B2
(45) Date of Patent: Dec. 17, 2024

(54) DISTRIBUTED-TONE RESOURCE UNIT TRANSMISSION SCHEMES WITH FREQUENCY-DOMAIN DUPLICATION IN 6GHz LPI SYSTEM

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 318 days.

(21) Appl. No.: 17/718,097

(22) Filed: Apr. 11, 2022

(65) Prior Publication Data

US 2022/0329373 A1    Oct. 13, 2022

Related U.S. Application Data

(60) Provisional application No. 63/173,533, filed on Apr. 12, 2021.

(51) Int. Cl.
*H04L 5/00* (2006.01)
*H04L 27/26* (2006.01)

(52) U.S. Cl.
CPC .......... *H04L 5/0046* (2013.01); *H04L 5/0064* (2013.01); *H04L 27/2657* (2013.01)

(58) Field of Classification Search
CPC .. H04L 5/0046; H04L 5/0064; H04L 27/2657
See application file for complete search history.

(56) References Cited

U.S. PATENT DOCUMENTS

| | | | | |
|---|---|---|---|---|
| 2020/0014509 | A1 * | 1/2020 | Asterjadhi | H04L 5/0041 |
| 2021/0392661 | A1 * | 12/2021 | Cao | H04W 72/0453 |
| 2022/0329397 | A1 * | 10/2022 | Hu | H04L 5/0078 |
| 2022/0345263 | A1 * | 10/2022 | Hu | H04L 5/0046 |

FOREIGN PATENT DOCUMENTS

EP         4054138 A1 *  9/2022   ......... H04L 27/2602

* cited by examiner

*Primary Examiner* — Derrick V Rose
(74) *Attorney, Agent, or Firm* — Andy M. Han; Han IP PLLC

(57) ABSTRACT

Various schemes pertaining to distributed-tone resource unit (dRU) transmission schemes with frequency-domain duplication in a 6 GHz low-power indoor (LPI) system are described. An apparatus distributes a plurality of subcarriers of a resource unit (RU) to generate a dRU with frequency-domain duplication on a plurality of frequency subblocks. The apparatus then communicates with a communication entity on the plurality of frequency subblocks.

16 Claims, 14 Drawing Sheets

(A) DUP SCENARIO-1:

| DRU ON SEG 1 | DRU DUPLICATED ON SEG 2 |

400

(B) DUP SCENARIO-2:

| DRU ON SEG 1 | DRU DUPLICATED ON SEG 2 | DRU DUPLICATED ON SEG 3 | DRU DUPLICATED ON SEG 4 |

DISTRIBUTE A PLURALITY OF SUBCARRIERS OF A RESOURCE UNIT (RU) TO GENERATE A DISTRIBUTED-TONE RU (dRU) WITH FREQUENCY-DOMAIN DUPLICATION ON A PLURALITY OF FREQUENCY SUBBLOCKS
1410

COMMUNICATE, VIA THE TRANSCEIVER, WITH A COMMUNICATION ENTITY ON THE PLURALITY OF FREQUENCY SUBBLOCKS
1420

DISTRIBUTED-TONE RESOURCE UNIT TRANSMISSION SCHEMES WITH FREQUENCY-DOMAIN DUPLICATION IN 6GHz LPI SYSTEM

CROSS REFERENCE TO RELATED PATENT APPLICATION

The present disclosure is part of a non-provisional patent application claiming the priority benefit of U.S. Provisional Patent Application No. 63/173,533, filed 12 Apr. 2021, the content of which being incorporated by reference in its entirety.

TECHNICAL FIELD

The present disclosure is generally related to wireless communications and, more particularly, to distributed-tone resource unit (dRU) transmission schemes with frequency-domain duplication in a 6 GHz low-power indoor (LPI) system.

BACKGROUND

Unless otherwise indicated herein, approaches described in this section are not prior art to the claims listed below and are not admitted as prior art by inclusion in this section.

Under current regulations by the Federal Communications Commission (FCC) regarding wireless communications in the 2.4 GHz and 5 GHz bands, the equivalent isotropically radiated power (EIRP) of a power spectral density (PSD) limit is capped at 20 dBm for 2 MHz transmission and the transmission (Tx) power limit is capped at 30 dBm. With a reasonable Tx power assumption, the FCC requirement would not limit Tx power for narrow-bandwidth transmissions. On the other hand, the FCC requirement regarding 6 GHz LPI applications is far more stringent than PSD requirement for the 2.4 GHz and 5 GHz bands. For instance, the EIRP limit is at 5 dBm/MHz for an access point (AP) station (STA) in 6 GHz LPI versus an EIRP limit of 17 dBm/MHz for APs in the 5 GHz band. Similarly, the EIRP limit is at −1 dBm/MHz for an non-AP STA in 6 GHz LPI versus an EIRP limit of 11 dBm/MHz for APs in the 5 GHz band.

Distributed-tone RUs (dRUs) and distributed-tone multi-RUs (dMRUs) have been proposed to spread subcarriers or tones over a wider bandwidth to boost transmit power and extend coverage range. Tone distribution can be limited to certain frequency ranges and/or window sizes such as, for example, dRU within an 80 MHz frequency segment or subblock, and tone distribution cannot span across any window boundary. However, some STAs can support a wider-bandwidth transmission (e.g., over 160 MHz or 320 MHz) and, as such, limitation on tone distribution could result in inefficient usage of available bandwidth. Therefore, there is a need for a solution for transmissions with frequency-domain duplication to further enhance coverage range in a 6 GHz LPI system.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to dRU transmission schemes with frequency-domain duplication in a 6 GHz LPI system. Moreover, it is believed that, under various proposed schemes in accordance with the present disclosure, dRU/dMRU transmissions with frequency-domain duplication may result in peak-to-average power ratio (PAPR) reduction.

In one aspect, a method may involve distributing a plurality of subcarriers of a RU to generate a dRU with frequency-domain duplication on a plurality of frequency subblocks. The method may also involve communicating with a communication entity on the plurality of frequency subblocks.

In yet another aspect, an apparatus may include a transceiver configured to transmit and receive wirelessly. The apparatus may also include a processor coupled to the transceiver. The processor may distribute a plurality of subcarriers of RU to generate a dRU with frequency-domain duplication on a plurality of frequency subblocks. The processor may also communicate, via the transceiver, with a communication entity (e.g., an AP STA or non-AP STA) on the plurality of frequency subblocks.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 4 is a diagram of an example scenario under a proposed scheme in accordance with an implementation of the present disclosure.

DETAILED DESCRIPTION OF PREFERRED EMBODIMENTS

Figure 1:
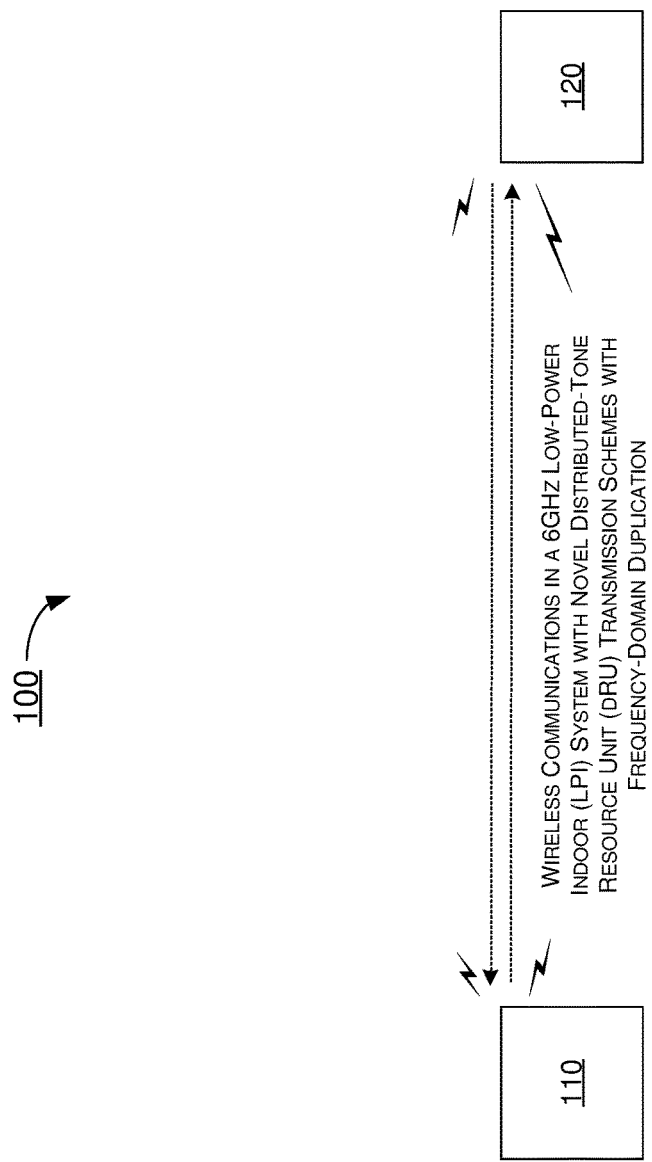
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to dRU transmission schemes with frequency-domain duplication in a 6 GHz LPI system. According to the present disclosure, a number of possible solutions may be implemented separately or jointly. That is, although these possible solutions may be described below separately, two or more of these possible solutions may be implemented in one combination or another.

It is noteworthy that, in the present disclosure, a 26-tone regular RU (rRU) may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on. Furthermore, in the present disclosure, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on. Additionally, an aggregate (26+52)-tone distributed-tone MRU may be interchangeably denoted as dMRU78, an aggregate (26+106)-tone distributed-tone MRU may be interchangeably denoted as dMRU132, and so on. Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, and a bandwidth of 320 MHz may be interchangeably denoted as BW320 or BW320M. It is further noteworthy that, in the present disclosure, a 26-tone interleaved-tone or interlaced-tone RU may be interchangeably denoted as iRU26, a 52-tone interleaved-tone or interlaced-tone RU may be interchangeably denoted as iRU52, a 106-tone interleaved-tone or interlaced-tone RU may be interchangeably denoted as iRU106, a 242-tone interleaved-tone or interlaced-tone RU may be interchangeably denoted as iRU242, and a 484-tone interleaved-tone or interlaced-tone RU may be interchangeably denoted as iRU484. Additionally, the term "frequency segment" is interchangeably referred to as "frequency subblock" herein. Furthermore, for simplicity in notation, the term "dRU" herein may represent both dRU and dMRU.

FIG. 1 illustrates an example network environment 100 in which various solutions and schemes in accordance with the present disclosure may be implemented. FIG. 2~FIG. 14 illustrate examples of implementation of various proposed schemes in network environment 100 in accordance with the present disclosure. The following description of various proposed schemes is provided with reference to FIG. 1~FIG. 14.

Referring to FIG. 1, network environment 100 may involve a communication entity 110 and a communication entity 120 communicating wirelessly (e.g., in a wireless local area network (WLAN) in accordance with one or more IEEE 802.11 standards). For instance, communication entity 110 may be a first STA and communication entity 120 may be a second STA, with each of the first STA and second STA functioning as either an AP STA or a non-AP STA. Under various proposed schemes in accordance with the present disclosure, communication entity 110 and communication entity 120 may be configured to communicate wirelessly with dRU or dMRU transmission schemes with frequency-domain duplication in a 6 GHz LPI system under various proposed schemes of the present disclosure, as described herein.

Figure 2:
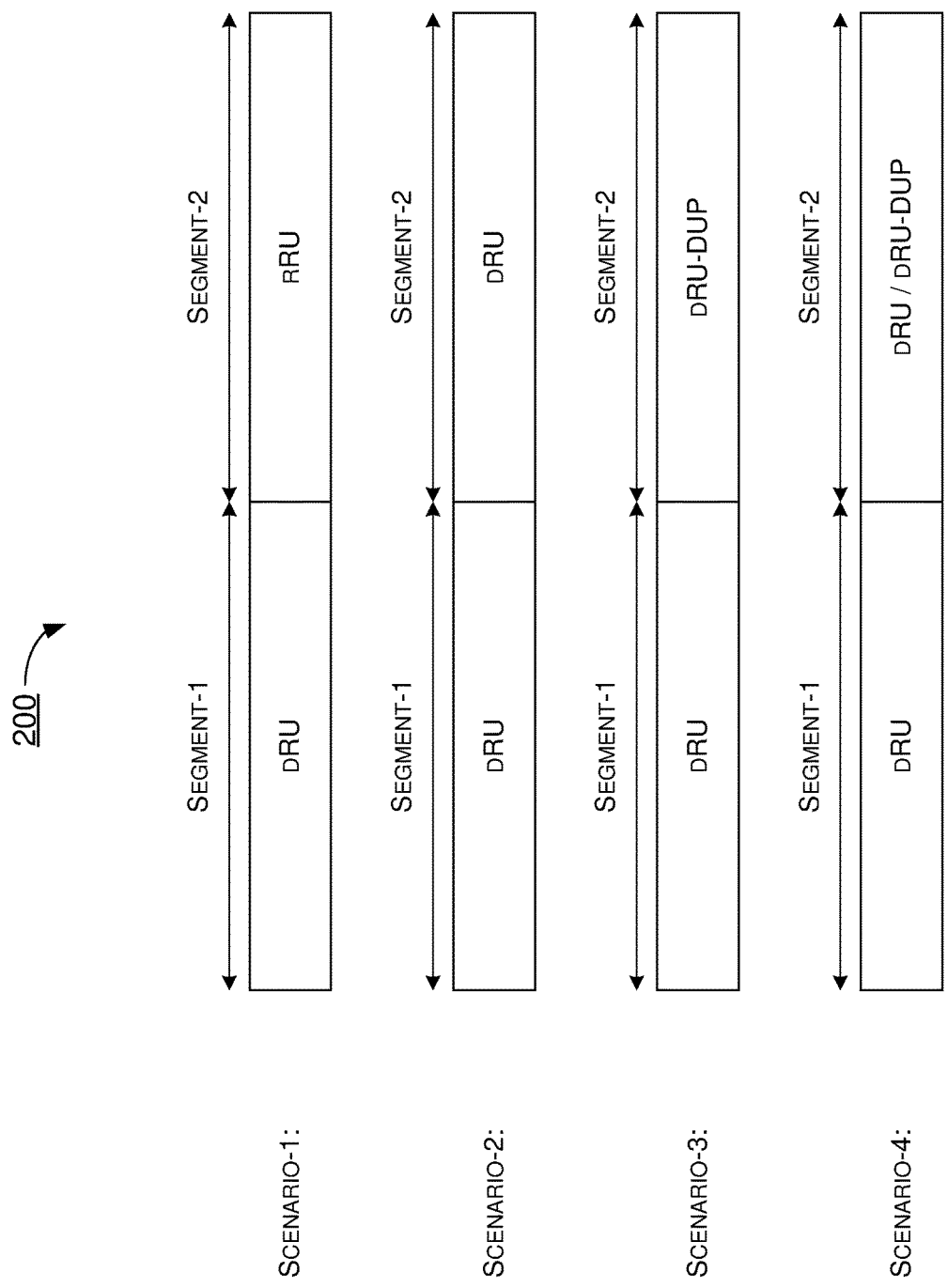
FIG. 2 is a diagram of an example scenario under a proposed scheme in accordance with an implementation of the present disclosure.

FIG. 2 illustrates an example scenario 200 of dRUs over frequency segments or subblocks under a proposed scheme in accordance with an implementation of the present disclosure. It is noteworthy that a frequency-segment range of a dRU may be referred to as a dRU window size or a dRU distribution bandwidth. Moreover, a dRU over a frequency segment or subblock may be referred to as a "dRU on segment" or "dRU on subblock". Under the proposed scheme, the dRU window size or distribution bandwidth may be 20 MHz, 40 MHz or 80 MHz (or another size) or, correspondingly, RU242, RU484 or RU996. Referring to FIG. 2, a dRU on two or more frequency subblocks may be operated in one of several situations (denoted as "Scenario-1", "Scenario-2", "Scenario-3" and "Scenario-4" in FIG. 2). In Scenario-1, a dRU may be transmitted in a first segment (denoted as "Segment-1" in FIG. 2) while a rRU may be transmitted in a second segment (denoted as "Segment-2" in FIG. 2). In Scenario-2, a respective dRU may be transmitted in each of Segment-1 and Segment-2, with each dRU scheduled with different users. In Scenario-3, a dRU may be transmitted in Segment-1 and scheduled with different users, and the dRU may be duplicated (as dRU-DUP, which is interchangeably referred to as "DUP" herein) in Segment-2. In Scenario-4, only a portion of one or more dRUs in Segment-1 may be duplicated in Segment-2, while one or more other dRUs may be either in Segment-1 or in Segment-2.

Figure 3:
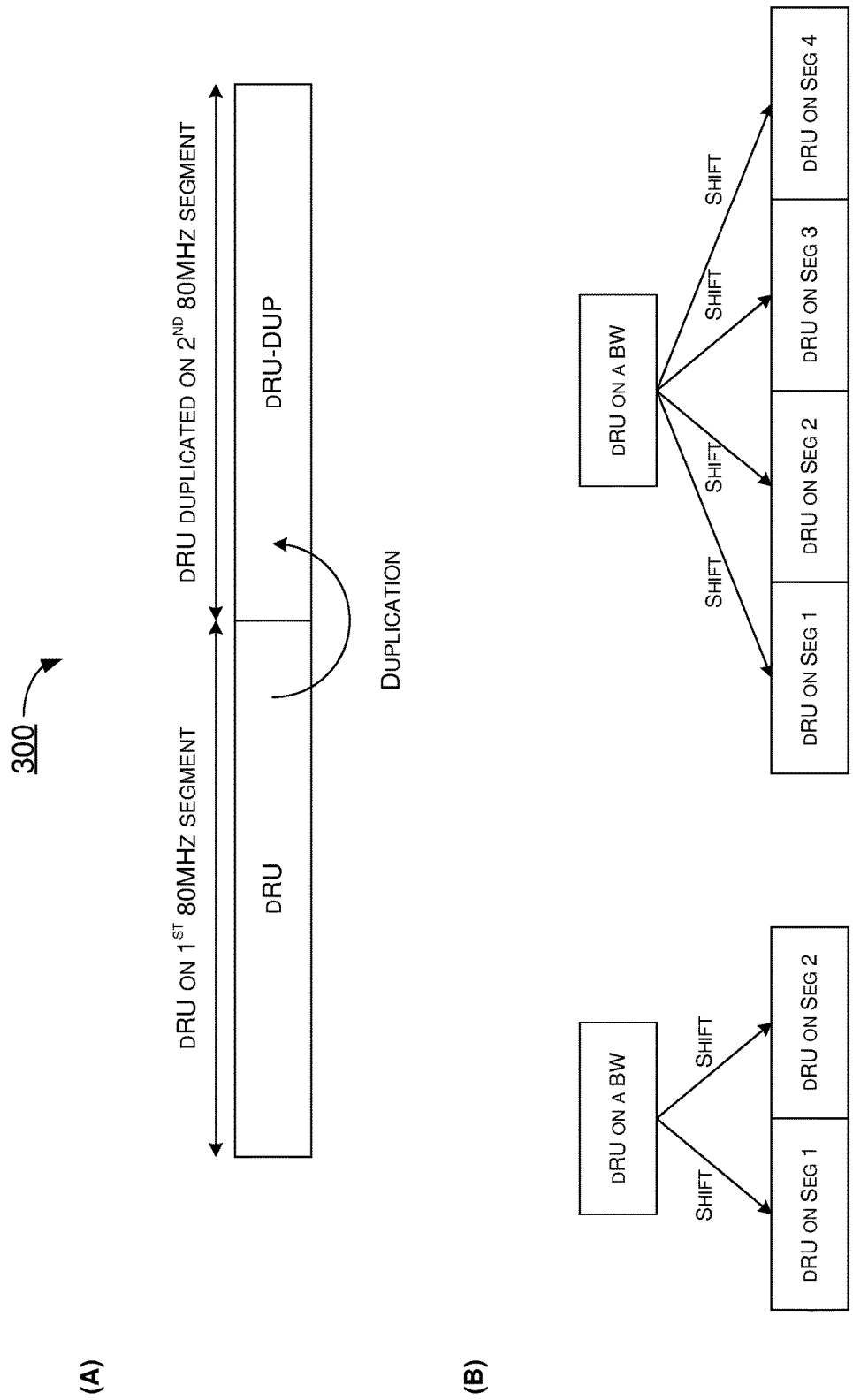
FIG. 3 is a diagram of an example scenario under a proposed scheme in accordance with an implementation of the present disclosure.

FIG. 3 illustrates an example scenario 300 of dRU+DUP and dRU on 80 MHz and DUP on 160 MHz under a proposed scheme in accordance with an implementation of the present disclosure. Referring to part (A) of FIG. 3, in one illustrative example, an operational bandwidth may be 160 MHz and the dRU distribution bandwidth may be 80 MHz. In this example, a dRU may be in a first (or lower) 80 MHz segment or subblock of the 160 MHz bandwidth while a duplication thereof (dRU-DUP) may be in a second (or upper) 80 MHz segment or subblock of the 160 MHz bandwidth. Under the proposed scheme, dRU indices may be generated based on dRU on BW80 (e.g., distribution bandwidth) by applying a constant shift to generate the dRU in each segment or subblock. For instance, dRU−512 may be generated for the dRU in the lower 80 MHz segment of 160 MHz bandwidth, and dRU+512 may be generated for the dRU-DUP in the upper 80 MHz segment of 160 MHz bandwidth, where dRU represents the subcarrier indices of dRU on BW80. Referring to part (B) of FIG. 3, two illustrative examples of a shift being applied to dRU indices (for "dRU on segment" or "dRU on subblock") to generate respective dRU in each of several segments or frequency subblocks are shown.

FIG. 4 illustrates an example scenario 400 of example operations with frequency-domain duplication under a proposed scheme in accordance with an implementation of the present disclosure. Referring to part (A) of FIG. 4, in a first example (denoted as "DUP Scenario-1" in FIG. 4), a dRU may be duplicated one time or put differently, transmission of the dRU may be repeated twice in the frequency domain. This situation may be interchangeably referred to as "2×duplication" or "2×DUP" herein. For instance, a dRU distributed in one 80 MHz segment may be duplicated over an entire 160 MHz bandwidth or frequency subblock. Alternatively, a dRU distributed in one 20 MHz segment may be duplicated over an entire 40 MHz bandwidth or frequency subblock, and so on. Referring to part (B) of FIG. 4, in a second example (denoted as "DUP Scenario-2" in FIG. 4), a dRU may be duplicated three times or put differently, transmission of the dRU may be repeated four times in the frequency domain. This situation may be interchangeably referred to as "4×duplication" or "4×DUP" herein. For instance, a dRU distributed in one 80 MHz segment may be duplicated over an entire 320 MHz bandwidth. Alternatively, a dRU distributed in one 20 MHz segment may be duplicated over an entire 80 MHz bandwidth or frequency subblock, and so on.

Figure 5:
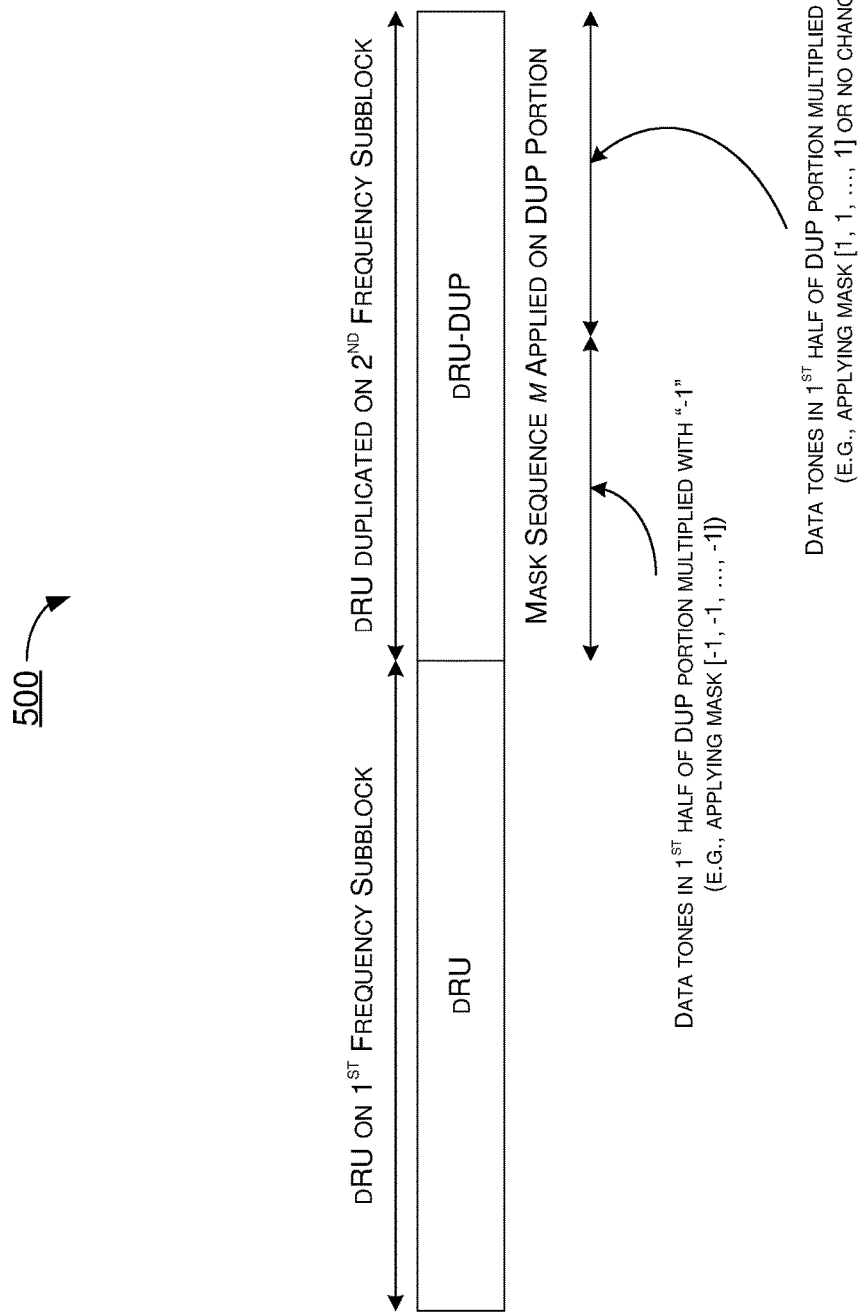
FIG. 5 is a diagram of an example scenario under a proposed scheme in accordance with an implementation of the present disclosure.

FIG. 5 illustrates an example scenario 500 of consideration on PAPR reduction for dRU+DUP with 2×DUP under a proposed scheme in accordance with an implementation of the present disclosure. Under the proposed scheme, PAPR reduction may be achieved by applying a mask sequence on the DUP portion. The mask sequence may be applied for both extremely-high-throughput long training field (EHT-LTF) and data symbols (of a physical-layer protocol data unit (PPDU)) except for pilot tones. In the illustrative example shown in FIG. 5, a dRU may be distributed over a first frequency subblock and duplicated as dRU-DUP on a second frequency subblock. Under the proposed scheme, a sequence mask m may be applied on the dRU-DUP. For instance, the tones or subcarriers of EHT-LTF and data symbols in the first half of the DUP portion (except for pilot tones) may be multiplied with a value of −1 (e.g., by applying a mask of [−1, −1, . . . , −1]. Moreover, the tones or subcarriers of EHT-LTF and data symbols in the second half of the DUP portion (except for pilot tones) may be multiplied with a value of +1 (e.g., by applying a mask of [1, 1, . . . , 1] or no change thereto). It is noteworthy that the notion of multiplying with the value of +1 is equivalent to having no mask applied. It is also noteworthy that this 2×DUP scenario may be applied to different cases such as, for example and without limitation: (a) a dRU on a first 20 MHz frequency subblock and duplicated over a second 20 MHz frequency subblock of a BW40 or 40 MHz frequency segment; (b) a dRU on a first 40 MHz frequency subblock and duplicated over a second 40 MHz frequency subblock of a BW80 or 80 MHz frequency segment; (c) a dRU on a first 80 MHz frequency subblock and duplicated over a second 80 MHz frequency subblock of a BW160 or 160 MHz frequency segment; and (d) a dRU on a first 160 MHz frequency subblock and duplicated over a second 160 MHz frequency subblock of a BW320.

Figure 6:
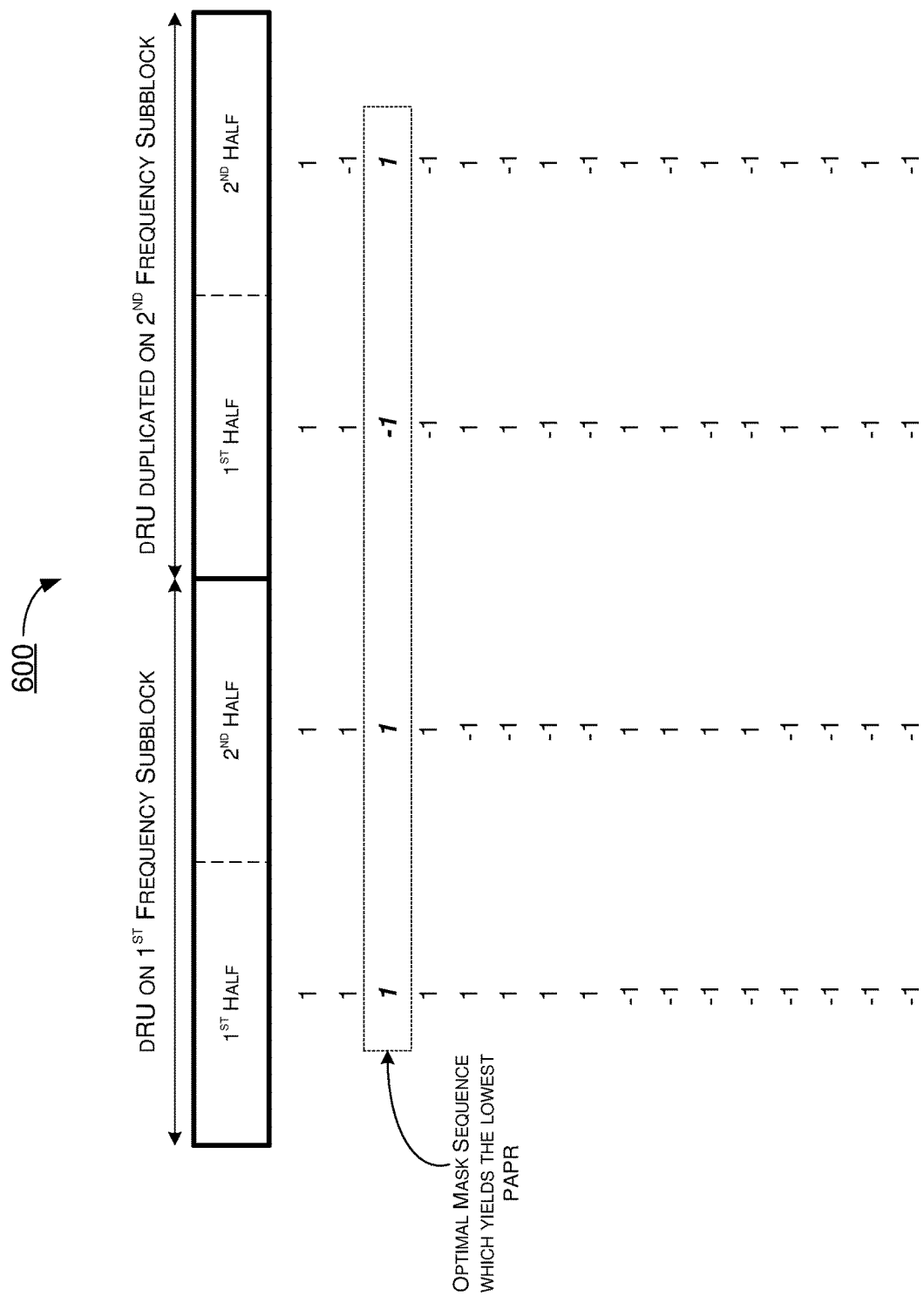
FIG. 6 is a diagram of an example design under a proposed scheme in accordance with an implementation of the present disclosure.

FIG. 6 illustrates an example design 600 of an optimal mask sequence for 2×DUP under a proposed scheme in accordance with an implementation of the present disclosure. Under the proposed scheme, the optimal mask sequence may be designed or otherwise obtained through a search procedure. For instance, initially, each dRU and dRU+DUP may be split into a first half and a second half. Then, either the value of −1 or the value of +1 may be applied to EHT-LTF and data symbols or tones of the first half (except for pilot tones) as well as applied to EHT-LTF and data symbols or tones of the second half (except for pilot tones), and there may be up to sixteen different combinations thereby yielding sixteen possible sequences. Next, exhaustive searches on all sixteen sequences may be performed. Lastly, the one sequence among the sixteen sequences resulting in the lowest PAPR for both EHT-LTF and data symbols may be identified as the optimal mask sequence. In the illustrative example shown in FIG. 6, the sequence [1 1 −1 1] may be identified and used as the optimal mask sequence as it results in the lowest PAPR among all sixteen sequences.

Figure 7:
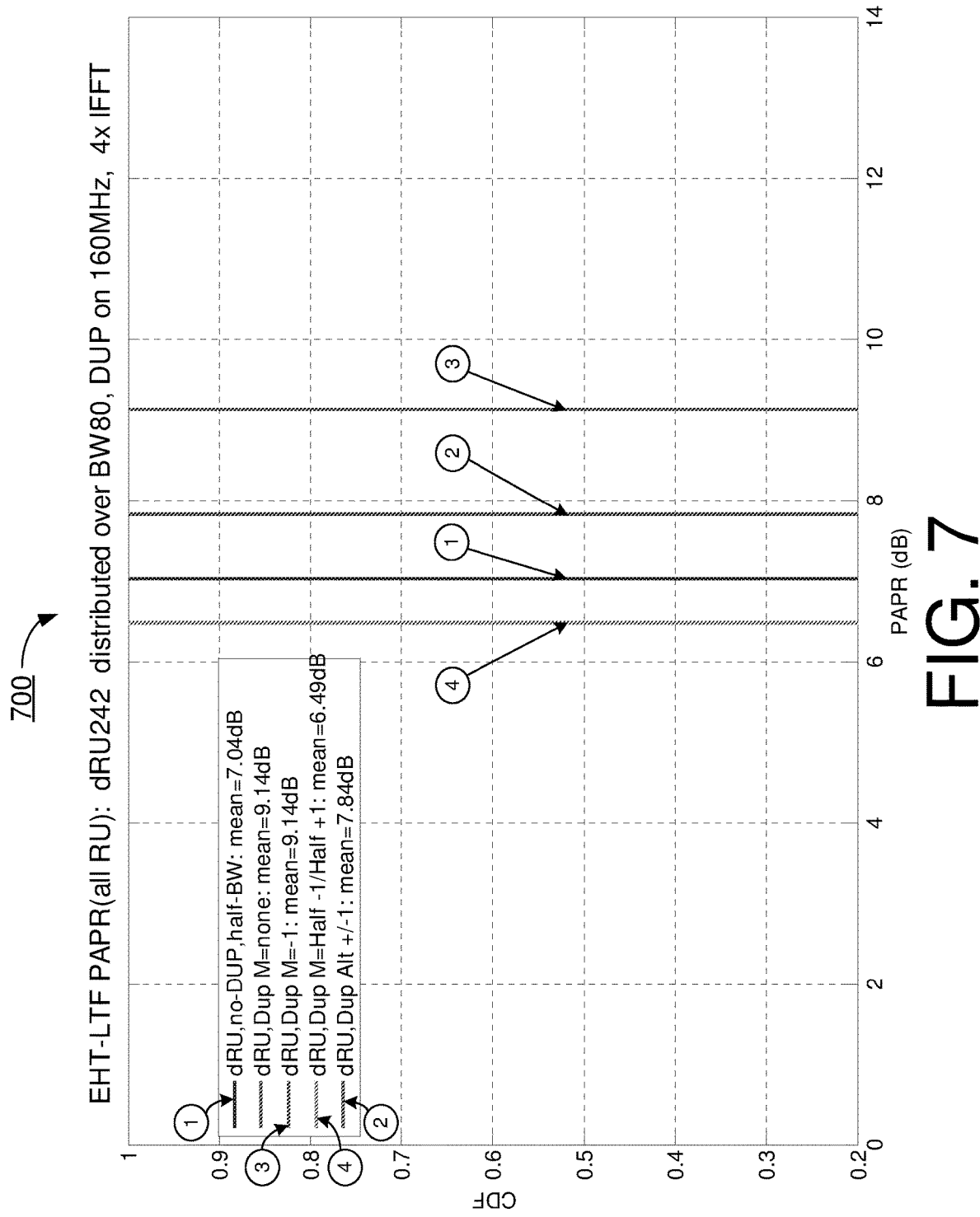
FIG. 7 is a diagram of an example scenario under a proposed scheme in accordance with an implementation of the present disclosure.
Figure 8:
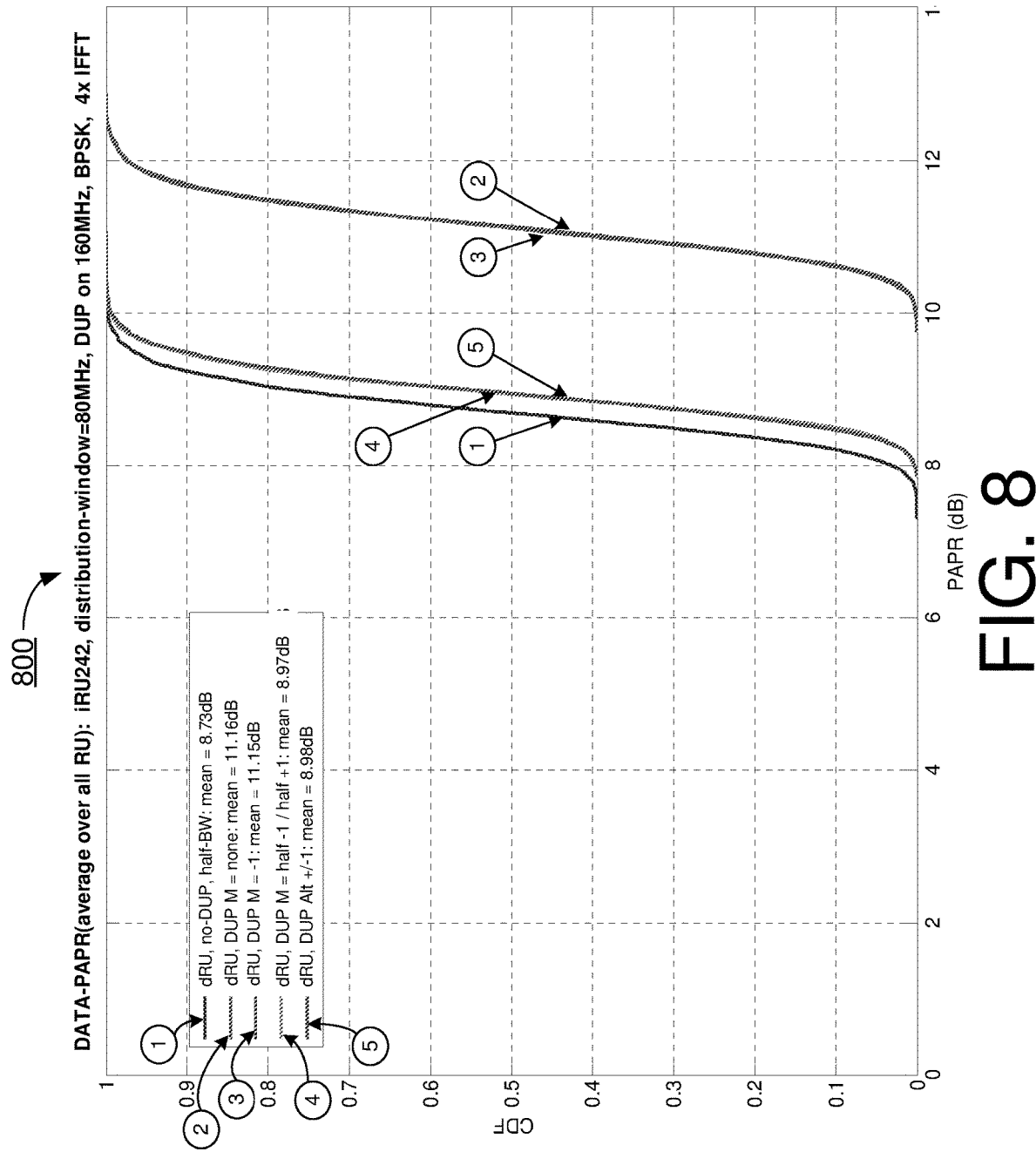
FIG. 8 is a diagram of an example scenario under a proposed scheme in accordance with an implementation of the present disclosure.

FIG. 7 illustrates an example scenario 700 under a proposed scheme in accordance with an implementation of the present disclosure. Scenario 700 shows an illustrative example of simulation on 2×DUP PAPR reduction for the EHT-LTF portion of a PPDU with a 242-tone dRU over BW80 and duplicated on 160 MHz. In FIG. 7, one of the several curves of simulation results from different PAPR reduction methods and mask sequences, labeled as curve number (4), has the lowest PAPR as a result applying the proposed mask sequence. FIG. 8 illustrates an example scenario 800 under a proposed scheme in accordance with an implementation of the present disclosure. Scenario 800 shows an illustrative example of simulation on 2×DUP PAPR reduction for the data portion of a PPDU with a 242-tone dRU over BW80 and duplicated on 160 MHz. In FIG. 8, one of the several curves of simulation results from different PAPR reduction methods and mask sequences, labeled as curve number (4), has the lowest PAPR as a result applying the proposed mask sequence.

Figure 9:
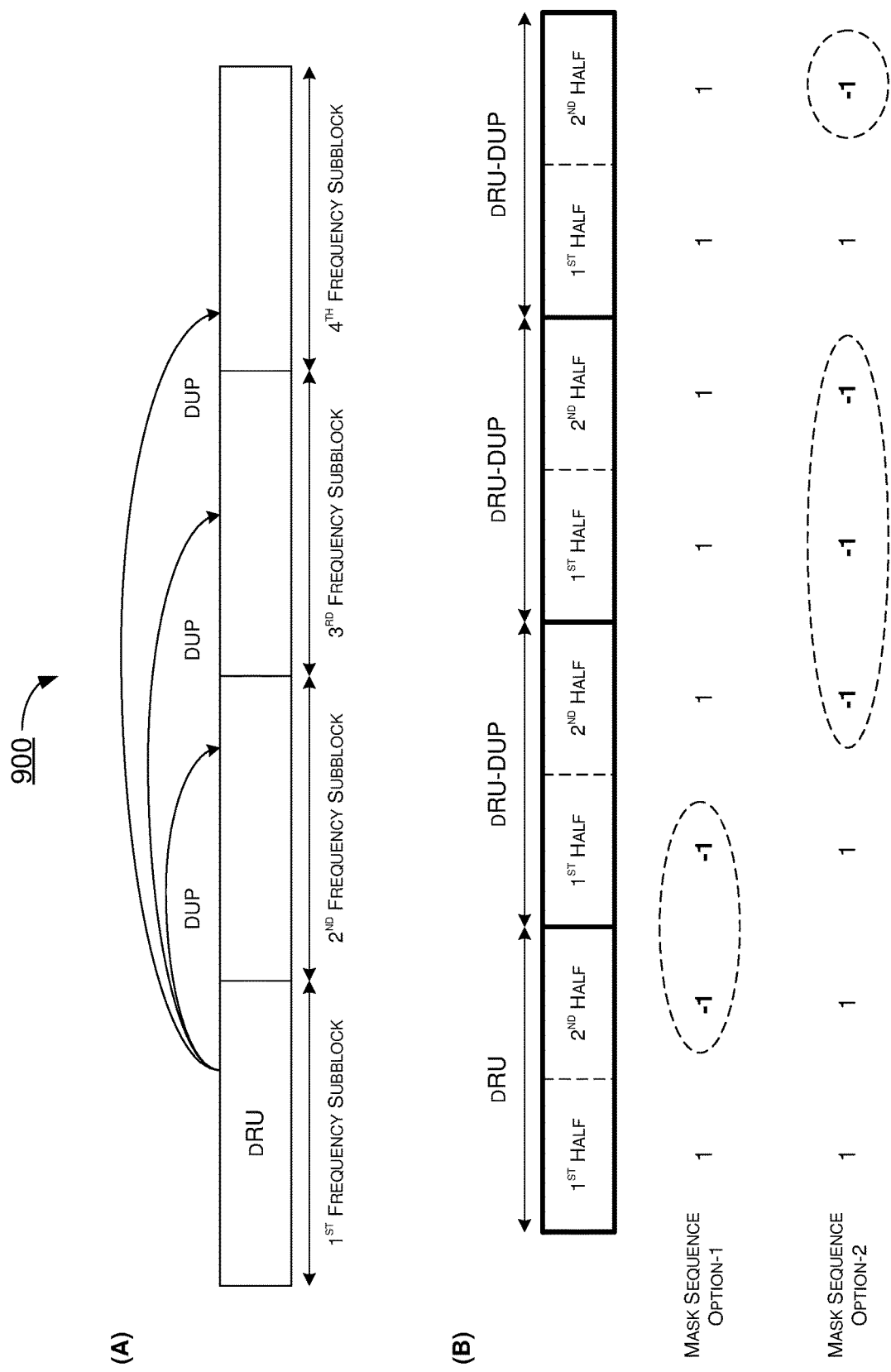
FIG. 9 is a diagram of an example design under a proposed scheme in accordance with an implementation of the present disclosure.

FIG. 9 illustrates an example design 900 of PAPR reduction for dRU+DUP with 4×DUP under a proposed scheme in accordance with an implementation of the present disclosure. Referring to part (A) of FIG. 9, a dRU in the first frequency subblock may be duplicated as dRU-DUP in the second, the third and the fourth frequency subblocks. Referring to part (B) of FIG. 9, two options of a mask sequence may be applied to reduce PAPR. In the first option, the value of +1 (or no change) may be applied to the following: the first half of the dRU in the first frequency subblock, the second half of the dRU-DUP in the second frequency subblock, both halves of the dRU-DUP in the third frequency subblock, and both halves of the dRU-DUP in the fourth frequency subblock. Moreover, in the first option, the value of −1 may be applied to the following: the second half of the dRU in the first frequency subblock and the first half of the dRU-DUP in the second frequency subblock. In the second option, the value of +1 (or no change) may be applied to the following: both halves of the dRU in the first frequency subblock, the first half of the dRU-DUP in the second frequency subblock, and the first half of the dRU-DUP in the fourth frequency subblock. Furthermore, in the second option, the value of −1 may be applied to the following: the second half of the dRU-DUP in the second frequency subblock, both halves of the dRU-DUP in the third frequency subblock, and the second half of the dRU-DUP in the fourth frequency subblock. It is noteworthy that the notion of multiplying with the value of +1 is equivalent to having no mask applied. It is noteworthy that this 4×DUP scenario may be applied to different cases such as, for example and without limitation: (a) a dRU on a first 20 MHz frequency subblock and duplicated over second, third and fourth 20 MHz frequency subblocks of a BW80 or 80 MHz frequency segment; (b) a dRU on a first 40 MHz frequency subblock and duplicated over second, third and fourth 40 MHz frequency subblocks of a BW160 or 16 MHz frequency segment; and (c) a dRU on a first 80 MHz frequency subblock and duplicated over second, third and fourth 80 MHz frequency subblocks of a BW320.

Figure 10:
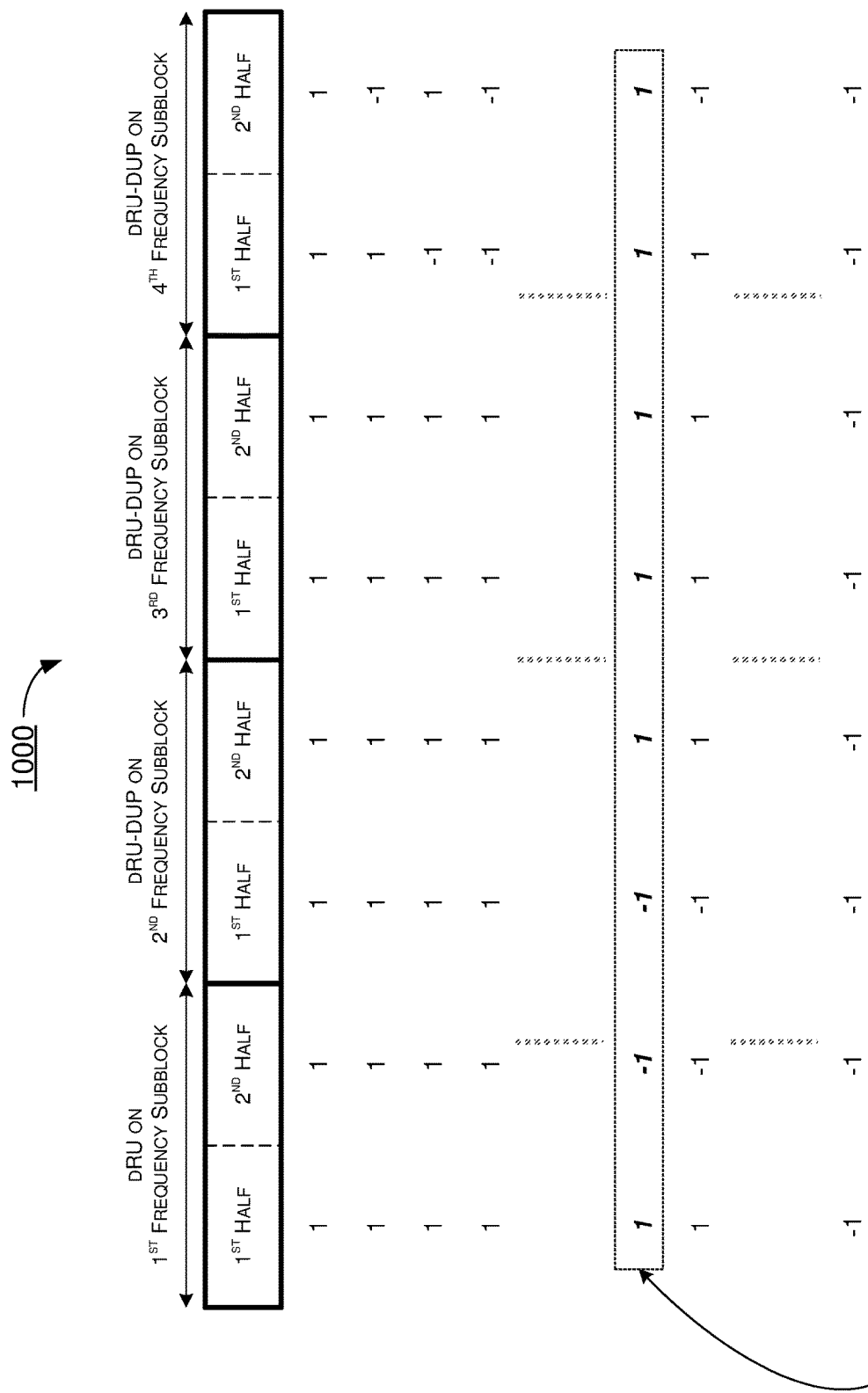
FIG. 10 is a diagram of an example design under a proposed scheme in accordance with an implementation of the present disclosure.

FIG. 10 illustrates an example design 1000 of an optimal mask sequence for 4×DUP under a proposed scheme in accordance with an implementation of the present disclosure.

Under the proposed scheme, the optimal mask sequence may be designed or otherwise obtained through a search procedure. For instance, initially, each dRU may be split into a first half and a second half. Then, either the value of −1 or the value of +1 may be applied to the first half and the second half of the dRU on each frequency subblock, and there may be up to 256 different combinations thereby yielding 256 possible sequences. Next, exhaustive searches on all 256 sequences may be performed. Lastly, the one sequence among the 256 sequences resulting in the lowest PAPR for both EHT-LTF and data symbols may be identified as the optimal mask sequence. In the illustrative example shown in FIG. 10, the sequence [1 −1 −1 1 1 1 1 1] may be identified and used as the optimal mask sequence as it results in the lowest PAPR among all 256 sequences.

Figure 11:
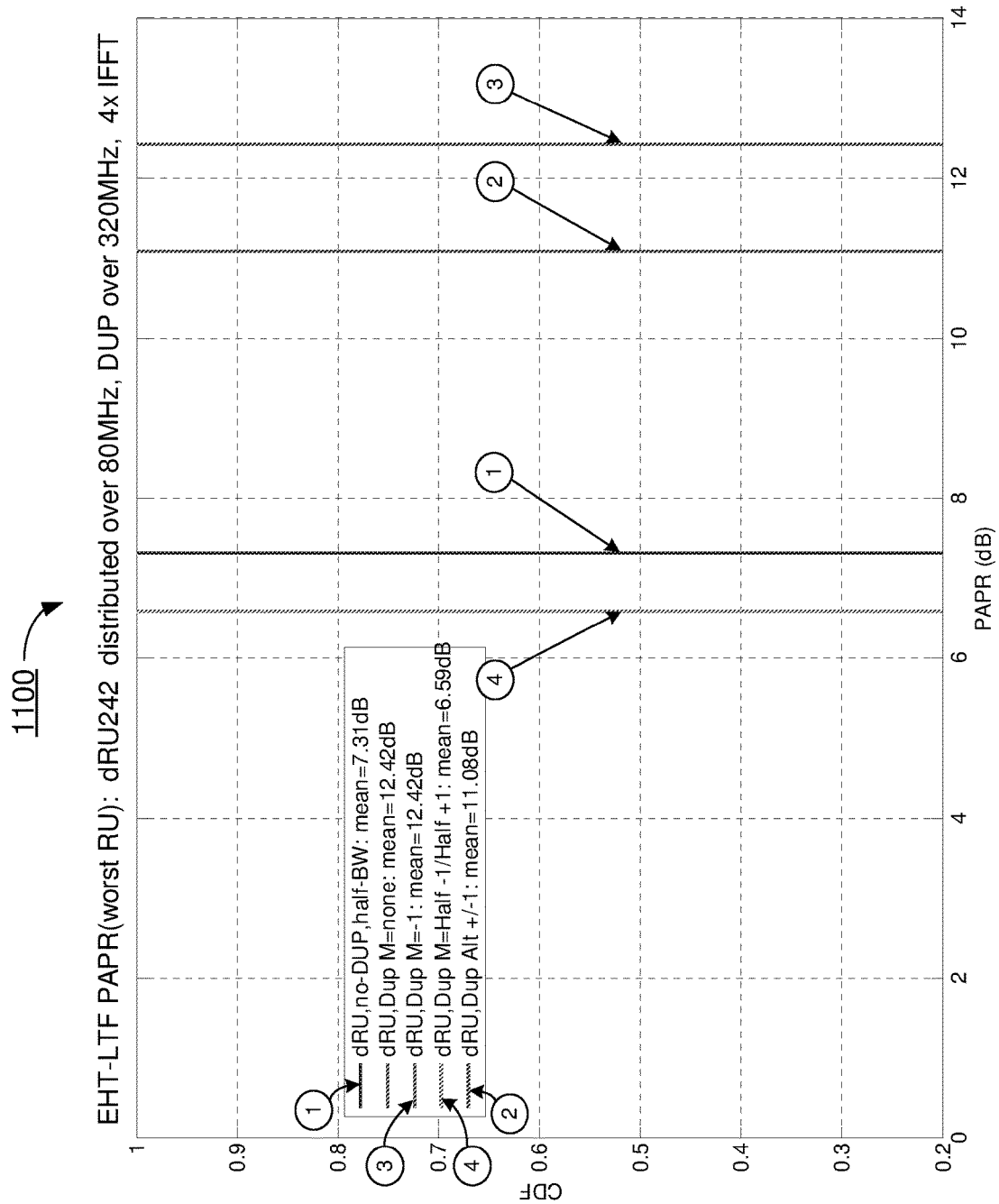
FIG. 11 is a diagram of an example scenario under a proposed scheme in accordance with an implementation of the present disclosure.
Figure 12:
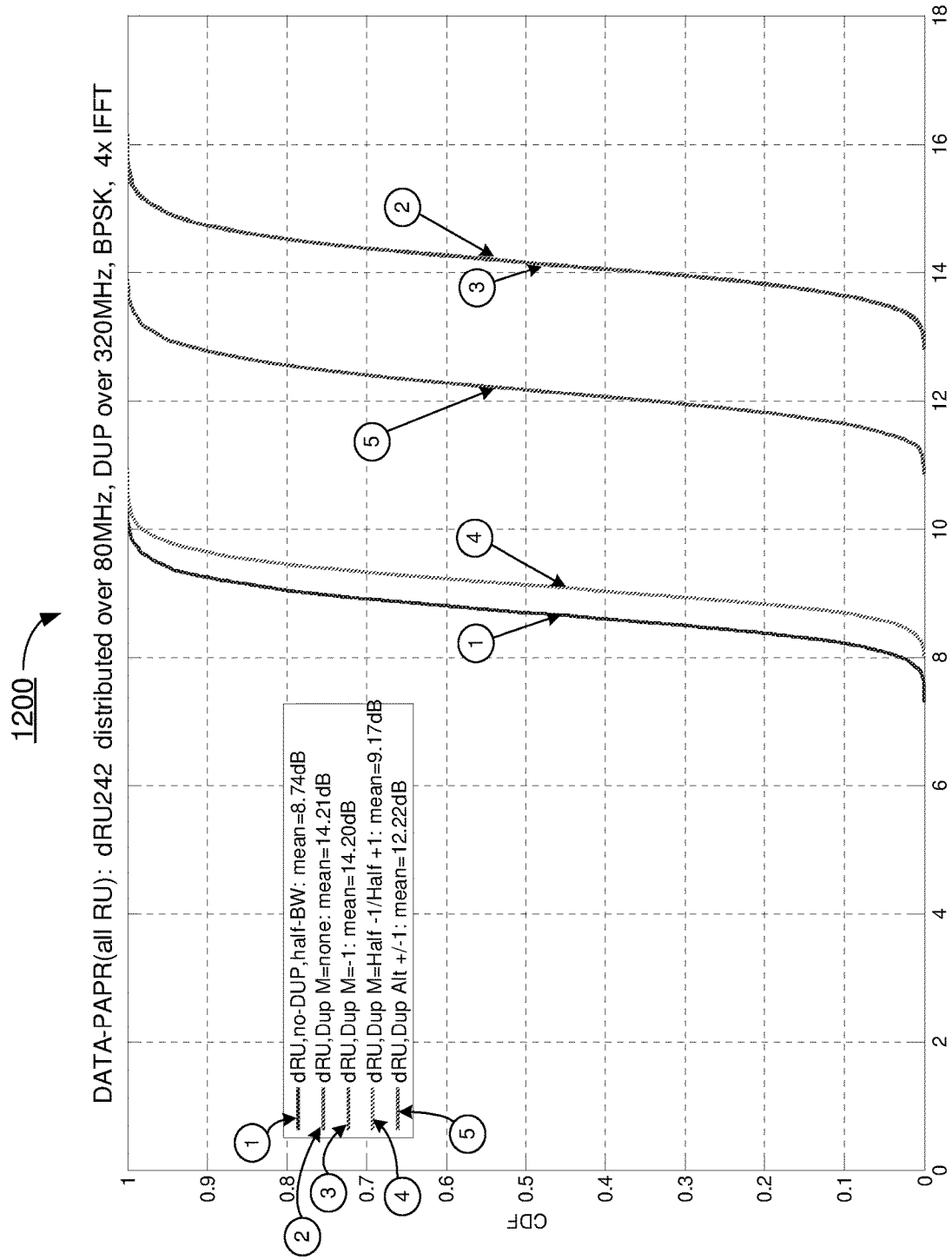
FIG. 12 is a diagram of an example scenario under a proposed scheme in accordance with an implementation of the present disclosure.

FIG. 11 illustrates an example scenario 1100 under a proposed scheme in accordance with an implementation of the present disclosure. Scenario 1100 shows an illustrative example of simulation on 4×DUP PAPR reduction for the EHT-LTF portion of a PPDU with a 242-tone dRU over BW80 and duplicated on 320 MHz. In FIG. 11, one of the several curves of simulation results from different PAPR reduction methods and mask sequences, labeled as curve number (4), has the lowest PAPR as a result applying the proposed mask sequence. FIG. 12 illustrates an example scenario 1200 under a proposed scheme in accordance with an implementation of the present disclosure. Scenario 1200 shows an illustrative example of simulation on 4×DUP PAPR reduction for the data portion of a PPDU with a 242-tone dRU over BW80 and duplicated on 320 MHz. In FIG. 12, one of the several curves of simulation results from different PAPR reduction methods and mask sequences, labeled as curve number (4), has the lowest PAPR as a result applying the proposed mask sequence.

Illustrative Implementations

Figure 13:
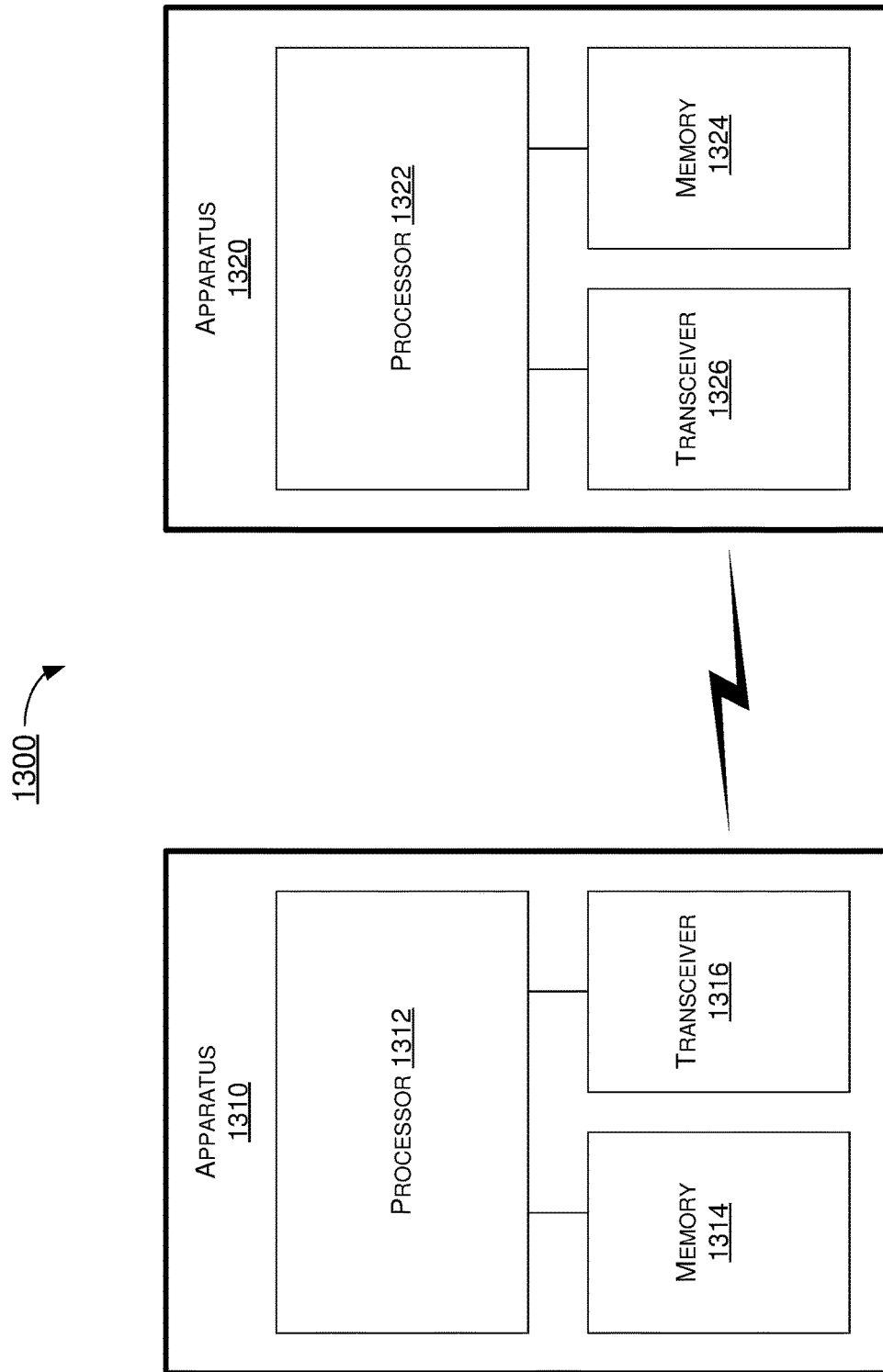
FIG. 13 is a block diagram of an example communication system in accordance with an implementation of the present disclosure.

FIG. 13 illustrates an example system 1300 having at least an example apparatus 1310 and an example apparatus 1320 in accordance with an implementation of the present disclosure. Each of apparatus 1310 and apparatus 1320 may perform various functions to implement schemes, techniques, processes and methods described herein pertaining to dRU transmission schemes with frequency-domain duplication in 6 GHz LPI systems, including the various schemes described above with respect to various proposed designs, concepts, schemes, systems and methods described above as well as processes described below. For instance, apparatus 1310 may be an example implementation of communication entity 110, and apparatus 1320 may be an example implementation of communication entity 120.

Each of apparatus 1310 and apparatus 1320 may be a part of an electronic apparatus, which may be a STA or an AP, such as a portable or mobile apparatus, a wearable apparatus, a wireless communication apparatus or a computing apparatus. For instance, each of apparatus 1310 and apparatus 1320 may be implemented in a smartphone, a smart watch, a personal digital assistant, a digital camera, or a computing equipment such as a tablet computer, a laptop computer or a notebook computer. Each of apparatus 1310 and apparatus 1320 may also be a part of a machine type apparatus, which may be an IoT apparatus such as an immobile or a stationary apparatus, a home apparatus, a wire communication apparatus or a computing apparatus. For instance, each of apparatus 1310 and apparatus 1320 may be implemented in a smart thermostat, a smart fridge, a smart door lock, a wireless speaker or a home control center. When implemented in or as a network apparatus, apparatus 1310 and/or apparatus 1320 may be implemented in a network node, such as an AP in a WLAN.

In some implementations, each of apparatus 1310 and apparatus 1320 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1310 and apparatus 1320 may be implemented in or as a STA or an AP. Each of apparatus 1310 and apparatus 1320 may include at least some of those components shown in FIG. 13 such as a processor 1312 and a processor 1322, respectively, for example. Each of apparatus 1310 and apparatus 1320 may further include one or more other components not pertinent to the proposed scheme of the present disclosure (e.g., internal power supply, display device and/or user interface device), and, thus, such component(s) of apparatus 1310 and apparatus 1320 are neither shown in FIG. 13 nor described below in the interest of simplicity and brevity.

In one aspect, each of processor 1312 and processor 1322 may be implemented in the form of one or more single-core processors, one or more multi-core processors, one or more RISC processors or one or more CISC processors. That is, even though a singular term "a processor" is used herein to refer to processor 1312 and processor 1322, each of processor 1312 and processor 1322 may include multiple processors in some implementations and a single processor in other implementations in accordance with the present disclosure. In another aspect, each of processor 1312 and processor 1322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1312 and processor 1322 is a special-purpose machine specifically designed, arranged and configured to perform specific tasks including those pertaining to dRU transmission schemes with frequency-domain duplication in a 6 GHz LPI system in accordance with various implementations of the present disclosure. For instance, each of processor 1312 and processor 1322 may be configured with hardware components, or circuitry, implementing one, some or all of the examples described and illustrated herein.

In some implementations, apparatus 1310 may also include a transceiver 1316 coupled to processor 1312. Transceiver 1316 may be capable of wirelessly transmitting and receiving data. In some implementations, apparatus 1320 may also include a transceiver 1326 coupled to processor 1322. Transceiver 1326 may include a transceiver capable of wirelessly transmitting and receiving data.

In some implementations, apparatus 1310 may further include a memory 1314 coupled to processor 1312 and capable of being accessed by processor 1312 and storing data therein. In some implementations, apparatus 1320 may further include a memory 1324 coupled to processor 1322 and capable of being accessed by processor 1322 and storing data therein. Each of memory 1314 and memory 1324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1314 and memory 1324 may include a type of read-only memory (ROM) such as mask ROM, programmable ROM (PROM), erasable programmable ROM (EPROM) and/or electrically erasable programmable ROM (EEPROM). Alternatively, or additionally, each of memory 1314 and memory 1324 may include a type of non-volatile random-access memory (NVRAM) such as flash memory, solid-state memory, ferroelectric RAM (FeRAM), magnetoresistive RAM (MRAM) and/or phase-change memory.

Each of apparatus 1310 and apparatus 1320 may be a communication entity capable of communicating with each other using various proposed schemes in accordance with the present disclosure. For illustrative purposes and without limitation, a description of capabilities of apparatus 1310, as communication entity 110, and apparatus 1320, as communication entity 120, is provided below. It is noteworthy that, although the example implementations described below are provided in the context of WLAN, the same may be implemented in other types of networks. Thus, although the following description of example implementations pertains to a scenario in which apparatus 1310 functions as a transmitting device and apparatus 1320 functions as a receiving device, the same is also applicable to another scenario in which apparatus 1310 functions as a receiving device and apparatus 1320 functions as a transmitting device.

Under a proposed scheme in accordance with the present disclosure with respect to dRU transmission schemes with frequency-domain duplication in a 6 GHz LPI system, processor 1312 of apparatus 1310 may distribute a plurality of subcarriers of a RU to generate a dRU with frequency-domain duplication on a plurality of frequency subblocks. Moreover, processor 1312 may communicate, via transceiver 1316, with a communication entity (e.g., apparatus 1320) on the plurality of frequency subblocks.

In some implementations, each of the plurality of frequency subblocks comprises a 20 MHz, 40 MHz or 80 MHz frequency subblock.

In some implementations, in distributing the plurality of subcarriers of the RU to generate the dRU, processor 1312 may generate the dRU on a first frequency subblock of the plurality of frequency subblocks and duplicate the dRU as a dRU-DUP on a second frequency subblock of the plurality of frequency subblocks.

In some implementations, in distributing the plurality of subcarriers of the RU to generate the dRU, processor 1312 may apply a mask sequence on at least the dRU-DUP on the second frequency subblock.

In some implementations, in applying the mask sequence, processor 1312 may perform certain operations including: (a) multiplying EHT-LTF and data tones in a first half of the dRU on the first frequency subblock with +1; (b) multiplying EHT-LTF and data tones in a second half of the dRU on the first frequency subblock with +1; (c) multiplying EHT-LTF and data tones in a first half of the dRU-DUP on the second frequency subblock with −1; and (d) multiplying EHT-LTF and data tones in a second half of the dRU-DUP on the second frequency subblock with +1.

In some implementations, in distributing the plurality of subcarriers of the RU to generate the dRU, processor 1312 may generate the dRU on a first frequency subblock of the plurality of frequency subblocks and duplicate the dRU as a dRU-DUP on second, third and fourth frequency subblocks of the plurality of frequency subblocks.

In some implementations, in distributing the plurality of subcarriers of the RU to generate the dRU, processor 1312 may apply a mask sequence on at least the dRU-DUP on the second, third and fourth frequency subblocks.

In some implementations, in applying the mask sequence, processor 1312 may perform certain operations including: (a) multiplying EHT-LTF and data tones in a first half of the dRU on the first frequency subblock with +1; (b) multiplying EHT-LTF and data tones in a second half of the dRU on the first frequency subblock with −1; (c) multiplying EHT-LTF and data tones in a first half of the dRU-DUP on the second frequency subblock with −1; (d) multiplying EHT-LTF and data tones in a second half of the dRU-DUP on the second frequency subblock with +1; (e) multiplying EHT-LTF and data tones in a first half of the dRU-DUP on the third frequency subblock with +1; (f) multiplying EHT-LTF and data tones in a second half of the dRU-DUP on the third frequency subblock with +1; (g) multiplying EHT-LTF and data tones in a first half of the dRU-DUP on the fourth frequency subblock with +1; and (h) multiplying EHT-LTF and data tones in a second half of the dRU-DUP on the fourth frequency subblock with +1.

Alternatively, in applying the mask sequence, processor 1312 may perform certain operations including: (a) multiplying EHT-LTF and data tones in a first half of the dRU on the first frequency subblock with +1; (b) multiplying EHT-LTF and data tones in a second half of the dRU on the first frequency subblock with +1; (c) multiplying EHT-LTF and data tones in a first half of the dRU-DUP on the second frequency subblock with +1; (d) multiplying EHT-LTF and data tones in a second half of the dRU-DUP on the second frequency subblock with −1; (e) multiplying EHT-LTF and data tones in a first half of the dRU-DUP on the third frequency subblock with −1; (f) multiplying EHT-LTF and data tones in a second half of the dRU-DUP on the third frequency subblock with −1; (g) multiplying EHT-LTF and data tones in a first half of the dRU-DUP on the fourth frequency subblock with +1; and (h) multiplying EHT-LTF and data tones in a second half of the dRU-DUP on the fourth frequency subblock with −1.

Illustrative Processes

Figure 14:
FIG. 14 is a flowchart of an example process in accordance with an implementation of the present disclosure.

FIG. 14 illustrates an example process 1400 in accordance with an implementation of the present disclosure. Process 1400 may represent an aspect of implementing various proposed designs, concepts, schemes, systems and methods described above. More specifically, process 1400 may represent an aspect of the proposed concepts and schemes pertaining to dRU transmission schemes with frequency-domain duplication in a 6 GHz LPI system in accordance with the present disclosure. Process 1400 may include one or more operations, actions, or functions as illustrated by one or more of blocks 1410 and 1420. Although illustrated as discrete blocks, various blocks of process 1400 may be divided into additional blocks, combined into fewer blocks, or eliminated, depending on the desired implementation. Moreover, the blocks/sub-blocks of process 1400 may be executed in the order shown in FIG. 14 or, alternatively in a different order. Furthermore, one or more of the blocks/sub-blocks of process 1400 may be executed repeatedly or iteratively. Process 1400 may be implemented by or in apparatus 1310 and apparatus 1320 as well as any variations thereof. Solely for illustrative purposes and without limiting the scope, process 1400 is described below in the context of apparatus 1310 as communication entity 110 (e.g., a transmitting device whether a STA or an AP) and apparatus 1320 as communication entity 120 (e.g., a receiving device whether a STA or an AP) of a wireless network such as a WLAN in accordance with one or more of IEEE 802.11 standards. Process 1400 may begin at block 1410.

At 1410, process 1400 may involve processor 1312 of apparatus 1310 distributing a plurality of subcarriers of a RU to generate a dRU with frequency-domain duplication on a plurality of frequency subblocks. Process 1400 may proceed from 1410 to 1420.

At 1420, process 1400 may involve processor 1312 communicating, via transceiver 1316, with a communication entity (e.g., apparatus 1320) on the plurality of frequency subblocks.

In some implementations, each of the plurality of frequency subblocks comprises a 20 MHz, 40 MHz or 80 MHz frequency subblock.

In some implementations, in distributing the plurality of subcarriers of the RU to generate the dRU, process 1400 may involve processor 1312 generating the dRU on a first frequency subblock of the plurality of frequency subblocks and duplicating the dRU as a dRU-DUP on a second frequency subblock of the plurality of frequency subblocks.

In some implementations, in distributing the plurality of subcarriers of the RU to generate the dRU, process 1400 may further involve processor 1312 applying a mask sequence on at least the dRU-DUP on the second frequency subblock.

In some implementations, in applying the mask sequence, process 1400 may involve processor 1312 performing certain operations including: (a) multiplying EHT-LTF and data tones in a first half of the dRU on the first frequency subblock with +1; (b) multiplying EHT-LTF and data tones in a second half of the dRU on the first frequency subblock with +1; (c) multiplying EHT-LTF and data tones in a first half of the dRU-DUP on the second frequency subblock with −1; and (d) multiplying EHT-LTF and data tones in a second half of the dRU-DUP on the second frequency subblock with +1.

In some implementations, in distributing the plurality of subcarriers of the RU to generate the dRU, process 1400 may involve processor 1312 generating the dRU on a first frequency subblock of the plurality of frequency subblocks and duplicating the dRU as a duplicated dRU (dRU-DUP) on second, third and fourth frequency subblocks of the plurality of frequency subblocks.

In some implementations, in distributing the plurality of subcarriers of the RU to generate the dRU, process 1400 may further involve processor 1312 applying a mask sequence on at least the dRU-DUP on the second, third and fourth frequency subblocks.

In some implementations, in applying the mask sequence, process 1400 may involve processor 1312 performing certain operations including: (a) multiplying EHT-LTF and data tones in a first half of the dRU on the first frequency subblock with +1; (b) multiplying EHT-LTF and data tones in a second half of the dRU on the first frequency subblock with −1; (c) multiplying EHT-LTF and data tones in a first half of the dRU-DUP on the second frequency subblock with −1; (d) multiplying EHT-LTF and data tones in a second half of the dRU-DUP on the second frequency subblock with +1; (e) multiplying EHT-LTF and data tones in a first half of the dRU-DUP on the third frequency subblock with +1; (f) multiplying EHT-LTF and data tones in a second half of the dRU-DUP on the third frequency subblock with +1; (g) multiplying EHT-LTF and data tones in a first half of the dRU-DUP on the fourth frequency subblock with +1; and (h) multiplying EHT-LTF and data tones in a second half of the dRU-DUP on the fourth frequency subblock with +1.

Alternatively, in applying the mask sequence, process 1400 may involve processor 1312 performing certain operations including: (a) multiplying EHT-LTF and data tones in a first half of the dRU on the first frequency subblock with +1; (b) multiplying EHT-LTF and data tones in a second half of the dRU on the first frequency subblock with +1; (c) multiplying EHT-LTF and data tones in a first half of the dRU-DUP on the second frequency subblock with +1; (d) multiplying EHT-LTF and data tones in a second half of the dRU-DUP on the second frequency subblock with −1; (e) multiplying EHT-LTF and data tones in a first half of the dRU-DUP on the third frequency subblock with −1; (f) multiplying EHT-LTF and data tones in a second half of the dRU-DUP on the third frequency subblock with −1; (g) multiplying EHT-LTF and data tones in a first half of the dRU-DUP on the fourth frequency subblock with +1; and (h) multiplying EHT-LTF and data tones in a second half of the dRU-DUP on the fourth frequency subblock with −1.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   distributing a plurality of subcarriers of a resource unit (RU) to generate a distributed-tone RU (dRU) with frequency-domain duplication on a plurality of frequency subblocks; and
   communicating with a communication entity on the plurality of frequency subblocks,
   wherein the distributing of the plurality of subcarriers of the RU to generate the dRU comprises generating the dRU on a first frequency subblock of the plurality of frequency subblocks and duplicating the dRU as a duplicated dRU (dRU-DUP) on a second frequency subblock of the plurality of frequency subblocks, and
   wherein the distributing of the plurality of subcarriers of the RU to generate the dRU further comprises applying a mask sequence on at least the dRU-DUP on the second frequency subblock.

2. The method of claim 1, wherein the applying of the mask sequence comprises:
   multiplying extremely-high-throughput long training field (EHT-LTF) and data tones in a first half of the dRU on the first frequency subblock with +1;
   multiplying EHT-LTF and data tones in a second half of the dRU on the first frequency subblock with +1;
   multiplying EHT-LTF and data tones in a first half of the dRU-DUP on the second frequency subblock with −1; and
   multiplying EHT-LTF and data tones in a second half of the dRU-DUP on the second frequency subblock with +1.

3. The method of claim 1, wherein each of the plurality of frequency subblocks comprises a 20 MHz, 40 MHz or 80 MHz frequency subblock.

4. The method of claim 1, wherein the distributing of the plurality of subcarriers of the RU to generate the dRU further comprises duplicating the dRU as the dRU-DUP on third and fourth frequency subblocks of the plurality of frequency subblocks.

5. The method of claim 4, wherein the distributing of the plurality of subcarriers of the RU to generate the dRU further comprises applying a mask sequence on at least the dRU-DUP on the second, third and fourth frequency subblocks.

6. The method of claim 5, wherein the applying of the mask sequence comprises:

multiplying extremely-high-throughput long training field (EHT-LTF) and data tones in a first half of the dRU on the first frequency subblock with +1;
multiplying EHT-LTF and data tones in a second half of the dRU on the first frequency subblock with −1;
multiplying EHT-LTF and data tones in a first half of the dRU-DUP on the second frequency subblock with −1;
multiplying EHT-LTF and data tones in a second half of the dRU-DUP on the second frequency subblock with +1;
multiplying EHT-LTF and data tones in a first half of the dRU-DUP on the third frequency subblock with +1;
multiplying EHT-LTF and data tones in a second half of the dRU-DUP on the third frequency subblock with +1;
multiplying EHT-LTF and data tones in a first half of the dRU-DUP on the fourth frequency subblock with +1; and
multiplying EHT-LTF and data tones in a second half of the dRU-DUP on the fourth frequency subblock with +1.

7. The method of claim 5, wherein the applying of the mask sequence comprises:
multiplying extremely-high-throughput long training field (EHT-LTF) and data tones in a first half of the dRU on the first frequency subblock with +1;
multiplying EHT-LTF and data tones in a second half of the dRU on the first frequency subblock with +1;
multiplying EHT-LTF and data tones in a first half of the dRU-DUP on the second frequency subblock with +1;
multiplying EHT-LTF and data tones in a second half of the dRU-DUP on the second frequency subblock with −1;
multiplying EHT-LTF and data tones in a first half of the dRU-DUP on the third frequency subblock with −1;
multiplying EHT-LTF and data tones in a second half of the dRU-DUP on the third frequency subblock with −1;
multiplying EHT-LTF and data tones in a first half of the dRU-DUP on the fourth frequency subblock with +1; and
multiplying EHT-LTF and data tones in a second half of the dRU-DUP on the fourth frequency subblock with −1.

8. The method of claim 4, wherein each of the plurality of frequency subblocks comprises a 20 MHz, 40 MHz or 80 MHz frequency subblock.

9. An apparatus, comprising:
a transceiver configured to communicate wirelessly; and
a processor coupled to the transceiver and configured to perform operations comprising:
distributing a plurality of subcarriers of a resource unit (RU) to generate a distributed-tone RU (dRU) with frequency-domain duplication on a plurality of frequency subblocks; and
communicating, via the transceiver, with a communication entity on the plurality of frequency subblocks,
wherein, in distributing the plurality of subcarriers of the RU to generate the dRU, the processor is configured to generate the dRU on a first frequency subblock of the plurality of frequency subblocks and duplicate the dRU as a duplicated dRU (dRU-DUP) on a second frequency subblock of the plurality of frequency subblocks, and
wherein, in distributing the plurality of subcarriers of the RU to generate the dRU, the processor is further configured to apply a mask sequence on at least the dRU-DUP on the second frequency subblock.

10. The apparatus of claim 9, wherein, in applying the mask sequence, the processor is configured to perform operations comprising:
multiplying extremely-high-throughput long training field (EHT-LTF) and data tones in a first half of the dRU on the first frequency subblock with +1;
multiplying EHT-LTF and data tones in a second half of the dRU on the first frequency subblock with +1;
multiplying EHT-LTF and data tones in a first half of the dRU-DUP on the second frequency subblock with −1; and
multiplying EHT-LTF and data tones in a second half of the dRU-DUP on the second frequency subblock with +1.

11. The apparatus of claim 9, wherein each of the plurality of frequency subblocks comprises a 20 MHz, 40 MHz or 80 MHz frequency subblock.

12. The apparatus of claim 9, wherein, in distributing the plurality of subcarriers of the RU to generate the dRU, the processor is further configured to duplicate the dRU as the dRU-DUP on third and fourth frequency subblocks of the plurality of frequency subblocks.

13. The apparatus of claim 12, wherein, in distributing the plurality of subcarriers of the RU to generate the dRU, the processor is further configured to apply a mask sequence on at least the dRU-DUP on the second, third and fourth frequency subblocks.

14. The apparatus of claim 13, wherein, in applying the mask sequence, the processor is configured to perform operations comprising:
multiplying extremely-high-throughput long training field (EHT-LTF) and data tones in a first half of the dRU on the first frequency subblock with +1;
multiplying EHT-LTF and data tones in a second half of the dRU on the first frequency subblock with −1;
multiplying EHT-LTF and data tones in a first half of the dRU-DUP on the second frequency subblock with −1;
multiplying EHT-LTF and data tones in a second half of the dRU-DUP on the second frequency subblock with +1;
multiplying EHT-LTF and data tones in a first half of the dRU-DUP on the third frequency subblock with +1;
multiplying EHT-LTF and data tones in a second half of the dRU-DUP on the third frequency subblock with +1;
multiplying EHT-LTF and data tones in a first half of the dRU-DUP on the fourth frequency subblock with +1; and
multiplying EHT-LTF and data tones in a second half of the dRU-DUP on the fourth frequency subblock with +1.

15. The apparatus of claim 13, wherein, in applying the mask sequence, the processor is configured to perform operations comprising:
multiplying extremely-high-throughput long training field (EHT-LTF) and data tones in a first half of the dRU on the first frequency subblock with +1;
multiplying EHT-LTF and data tones in a second half of the dRU on the first frequency subblock with +1;
multiplying EHT-LTF and data tones in a first half of the dRU-DUP on the second frequency subblock with +1;
multiplying EHT-LTF and data tones in a second half of the dRU-DUP on the second frequency subblock with −1;
multiplying EHT-LTF and data tones in a first half of the dRU-DUP on the third frequency subblock with −1;
multiplying EHT-LTF and data tones in a second half of the dRU-DUP on the third frequency subblock with −1;

multiplying EHT-LTF and data tones in a first half of the dRU-DUP on the fourth frequency subblock with +1; and multiplying EHT-LTF and data tones in a second half of the dRU-DUP on the fourth frequency subblock with −1.

16. The apparatus of claim 12, wherein each of the plurality of frequency subblocks comprises a 20 MHz, 40 MHz or 80 MHz frequency subblock.

* * * * *